United States Patent [19]  
Stephens

[11] 3,965,672  
[45] June 29, 1976

[54] WET COOLING TOWER WITH PLUME ELIMINATOR

[75] Inventor: James O. Stephens, Hamilton, Canada

[73] Assignee: Westinghouse Electric Corporation, Pittsburgh, Pa.

[22] Filed: May 23, 1974

[21] Appl. No.: 472,774

[52] U.S. Cl. .............................. 60/39.5; 60/692; 261/DIG. 11; 261/DIG. 77
[51] Int. Cl.² .......................... F02C 7/34; F28C 1/00
[58] Field of Search ............ 60/39.5, 685, 689, 690, 60/692; 261/DIG. 11, DIG. 77

[56] References Cited
UNITED STATES PATENTS

| | | | |
|---|---|---|---|
| 3,488,960 | 1/1920 | Kirkpatrick | 60/686 |
| 3,760,869 | 9/1973 | Brown | 261/DIG. 77 |
| 3,846,519 | 11/1974 | Spangemacher | 60/690 |

Primary Examiner—William L. Freeh  
Assistant Examiner—Louis J. Casaregola  
Attorney, Agent, or Firm—F. J. Baehr, Jr.

[57] ABSTRACT

A wet cooling tower has an encircling exhaust header in communication with the exhaust of a plurality of gas turbines and a plurality of upwardly inclined conduits, which direct the hot exhaust gas tangentially into the cooling tower to increase the temperature and velocity of the moisture laden air flowing therethrough to lift the effluent air into the upper atmosphere and eliminate the plume under many weather conditions.

6 Claims, 3 Drawing Figures

FIG. 3 is a sectional view taken on line III—III of FIG. 2.

WET COOLING TOWER WITH PLUME ELIMINATOR

BACKGROUND OF THE INVENTION

1. Field of the Invention:

This invention relates to cooling towers for power generation stations and more particularly to wet cooling towers with a plurality of upwardly inclined exhaust conduits that direct exhaust gases from a gas turbine into the cooling tower to eliminate the plume.

2. Description of the Prior Art:

In steam turbogenerator power plants, either nuclear or fossil fuel, the heat from the exhaust steam of the turbine has typically been transferred to cooling water from rivers, lakes or some other natural water supply. However, with the increased size and number of power plants, the availability of natural sources of cooling water has decreased, necessitating the use of cooling towers for many new installations.

Dry cooling towers, wherein circulating water is cooled by transferring heat to the air by plate or tube heat transfer surfaces, require extremely large heat transfer surfaces. Dry cooling towers may be so large that they may house a complete power plant within the cooling tower. (See U.S. Pat. No. 3,150,267)

Wet cooling towers, wherein the circulating water is brought into direct contact with the air, under many weather conditions produce a plume, which is both a nuisance and a problem, even though it is essentially pure water. The plume often causes local fogging and icing conditions on nearby roadways in winter months.

To eliminate the plume from wet cooling towers, the exhaust stack from a boiler has been centrally disposed within the cooling tower to raise the height to which the effluent leaving the cooling tower flows, see U.S. Pat. No. 3,488,960.

It is also known that in nuclear power plants, which reject large amounts of heat to circulating water, waste heat from gas turbines can be utilized to superheat the steam and heat feedwater to improve the overall cycle efficiency of generating power as discussed in a paper entitled *Gas Turbines for Superheat in a Nuclear Power Plant* by V. P. Buscemi and C. E. Hanton, which was presented at the American Power Conference, April 1970.

SUMMARY OF THE INVENTION

In general, a natural draft wet cooling tower, when made in accordance with this invention, has a header subtending at least a portion thereof, a duct for supplying hot gases to the header, and conduits extending from the header into the cooling tower. The conduits are so disposed with respect to the cooling tower that the hot gases flowing therethrough follow a generally upwardly swirling path increasing the temperature and velocity of the upwardly flowing moisture laden air to lift it into the upper atmosphere.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
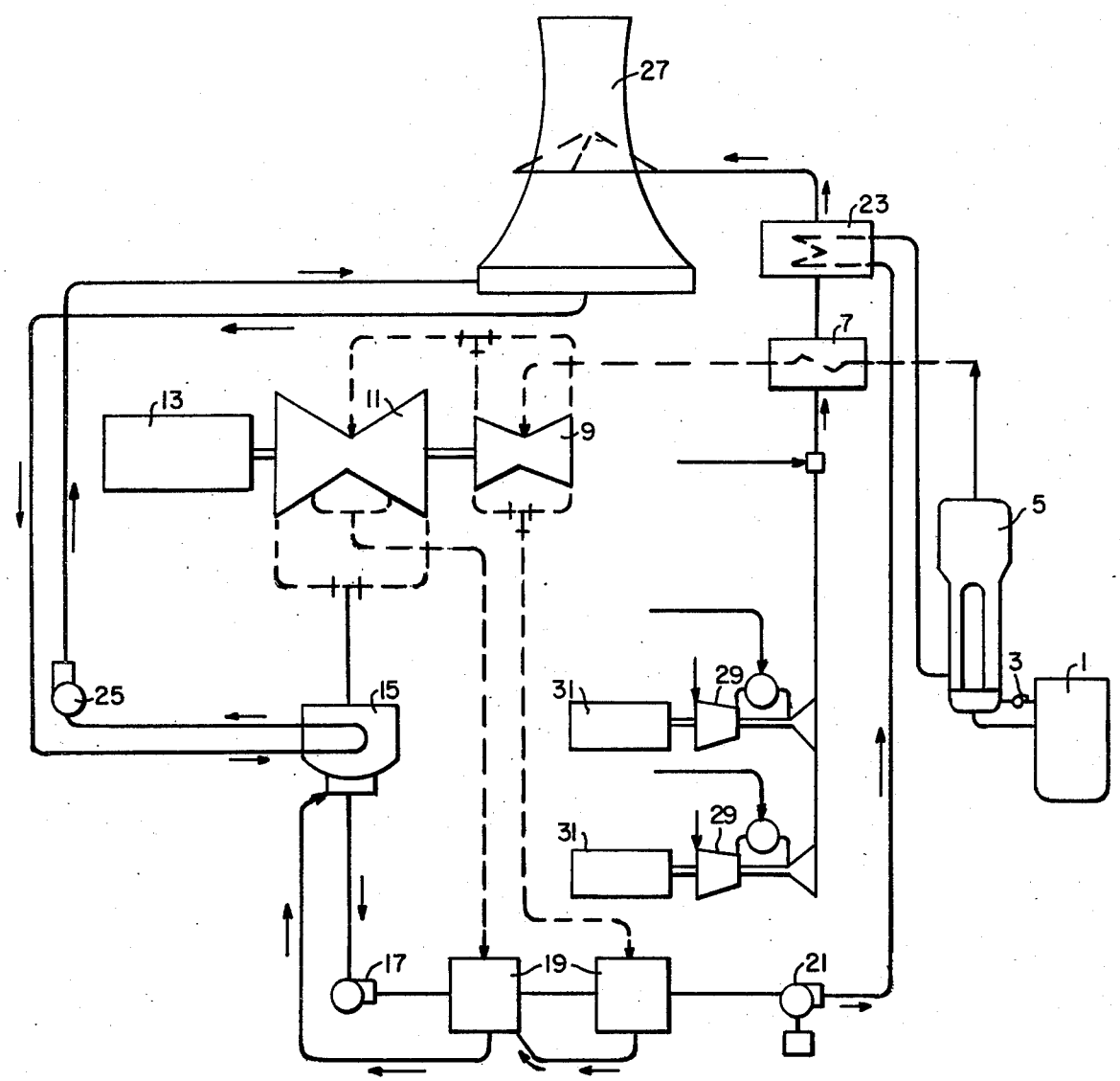
FIG. 1 is a flow diagram of a nuclear combined cycle power plant having both steam and gas turbines and a cooling tower made in accordance with this invention.

Referring now to the drawings in detail, FIG. 1 shows a flow diagram of a nuclear combined cycle power plant in which a nuclear reactor 1 produces the heat energy necessary to heat a primary fluid, which is circulated by a circulating pump 3 through a steam generator 5, which transfers heat from the primary fluid to a secondary fluid vaporizing the secondary fluid and producing steam, which passes through a superheater 7 and then to a high pressure and low pressure steam turbine 9 amd 11, respectively. The steam turbines 9 and 11 change the heat and pressure energy in the steam to rotating mechanical energy. A generator 13 connected on the same shaft as the steam turbines 9 and 11 converts rotating mechanical energy into electrical energy. A condenser 15 is connected to the exhaust of the low pressure steam turbine 11 condensing the steam to form condensate. The condensate is picked up by a condensate pump 17 and pumped through feedwater heaters 19 which receive extraction steam from the turbines 9 and 11. A boiler feed pump 21 takes its suction from the feedwater heaters 19 and pumps the boiler feed through an economizer 23 and back into the steam generator 5 forming a closed steam cycle.

A circulating water pump 25 pumps circulating water utilized to condense the exhaust steam in the condenser 15 to a wet cooling tower 27, wherein the circulating water is broken up into small droplets and brought into direct contact with air flowing through the tower due to natural circulation. The cooled circulating water is returned to the condenser 15 in order to condense the steam.

A plurality of gas turbines 29 are connected to generators 31 to produce additional electrical energy. The exhaust from the gas turbines 29 is utilized to superheat the steam in the superheater 7 and to heat feedwater in the economizer 23 and finally the exhaust gases from the gas turbine 29 are fed into the cooling tower 27 wherein they mix with the moisture laden air, increasing its temperature and velocity so that the moisture laden air will flow upwardly into the upper atmosphere.

Figure 3:
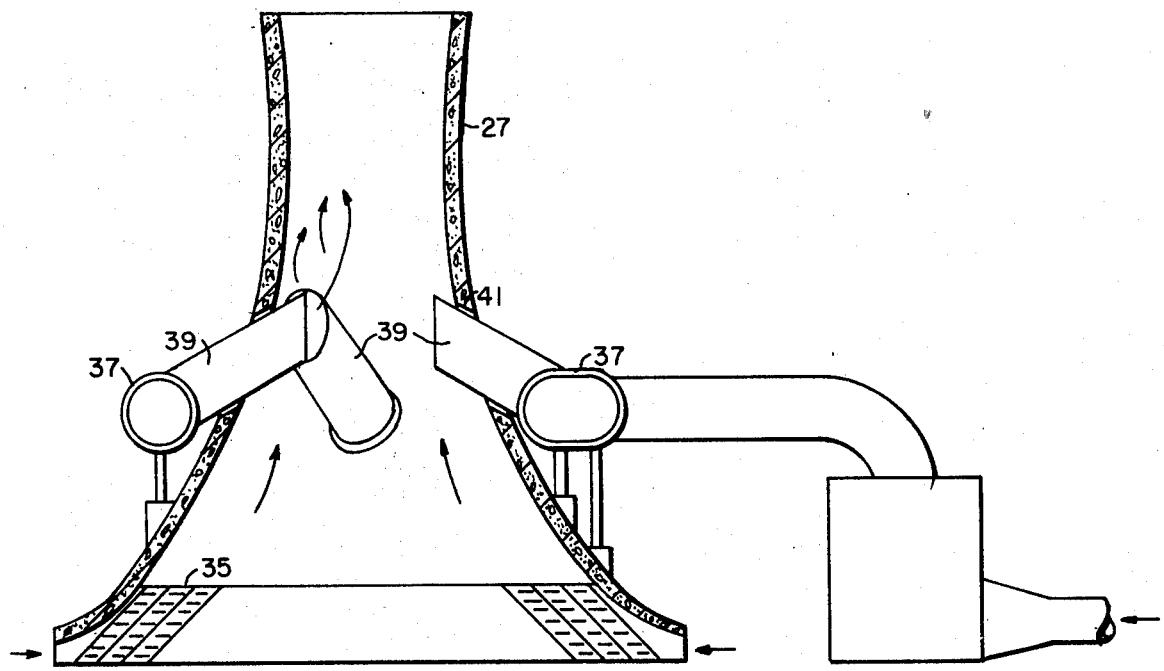
Figure 2:
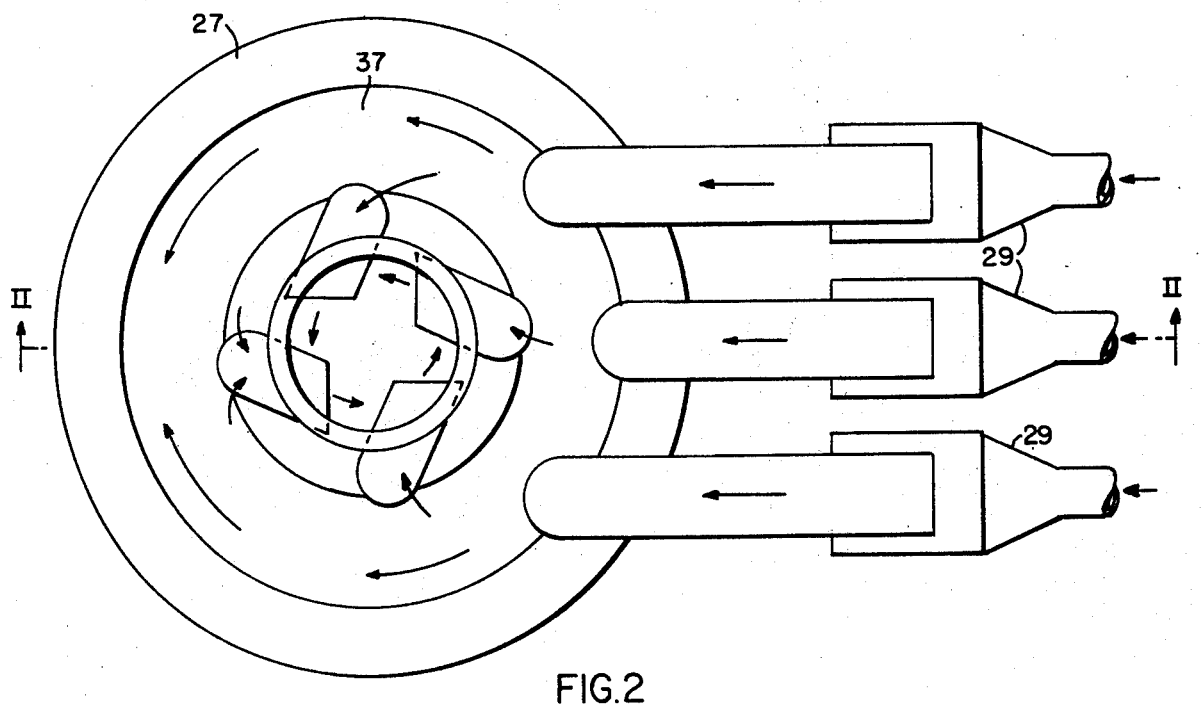
FIG. 2 is a plan view of the cooling tower.

A shown in FIGS. 2 and 3, the cooling tower 27 is a hyperbolic shaped natural draft wet cooling tower, the lower portion of which contains sprays and splash plates 35 to increase the surface area of the influent circulating water, thus increasing the contact area with the influent air. The moisture laden air flows upwardly due to natural circulation. While the embodiment described herein shows a natural circulation cooling tower, it is understood that this invention could also be utilized with a forced draft wet cooling tower.

The cooling tower 27 is subtended or encircled by an exhaust header 37. The exhaust header 37 is in fluid communication with the exhaust of the gas turbines 29, which supply hot gases to the header 37. A plurality of exhaust conduit means 39 are inclined upwardly and are generally disposed tangentially with respect to a circle disposed in the cooling tower 27 to thoroughly mix the hot exhaust gases with the moisture laden air, increasing its temperature and velocity so that as the effluent mixture emerges from the upper end of the cooling tower 27 its buoyancy and velocity are sufficient to cause it to rise into the upper atmosphere, and under most weather conditions the effluent does not produce a visible plume.

The exhaust header 37 has various cross-sections; however, the cross-sectional area of the exhaust generally decreases from that portion where the hot gases are supplied thereto as it progresses to the other side of the cooling tower.

The cooling tower 27 has openings 41 which are larger than the conduit 39 entering therethrough to allow for expansion of the conduit 39 and to prevent the conduit 39 from transferring heat to the wall of the cooling tower 27.

The combined cycle system, hereinbefore described, advantageously utilizes the waste heat from a gas turbine to produce superheated steam increasing the overall efficiency of the power generating station and adding heat and velocity to the effluent moisture laden air flowing from the cooling tower 27, increasing its buoyancy so that it rises into the upper atmosphere and eliminates local fogging and icing and under many weather conditions eliminates the visible plume, thus utilizing low grade heat energy, which would normally be wasted even in a combined cycle plan, to perform some useful work.

What is claimed is:

1. In combination a wet cooling tower, a header subtending at least a portion of said cooling tower, means for supplying hot gases to said header, a plurality of conduits extending from said header into said cooling tower, each of said conduits being inclined upwardly and being generally disposed tangentially with respect to a circle disposed within the cooling tower, whereby hot gases flowing through said conduits follow a generally upwardly swirling path increasing the temperature and velocity of the upwardly flowing moisture laden air inducing mixing and lifting the moisture laden air into the upper atmosphere.

2. The combination set forth in claim 1, wherein the header encircles the cooling tower.

3. The combination set forth in claim 1, wherein the header decreases in cross-sectional area from that portion which is connected to the supply means.

4. The combination as set forth in claim 1, wherein the means for supplying hot gases to the header comprises at least one gas turbine having its exhaust in communication with the header.

5. The combination as set forth in claim 1, wherein the means for supplying hot gases comprises a plurality of gas turbines having their exhaust in communication with the header.

6. The combination as set forth in claim 1, wherein the cooling tower has holes disposed therein for accepting the conduit means and the holes are larger than the conduit means to allow for expansion and to prevent the transfer of the heat from the conduit means to the cooling tower.

* * * * *